Feb. 22, 1966  J. G. HOWELL, JR  3,236,134
APPARATUS FOR MANUFACTURING PAPERBOARD PARTITIONS
Filed Dec. 23, 1963  7 Sheets-Sheet 1

Inventor: John G. Howell Jr.
By: J. R. Nelson and W. A. Schuich
Attorneys

INVENTOR.
John G. Howell Jr.
BY J.R. Nelson and W.A. Schaich
Attorneys

INVENTOR.
John G. Howell Jr.

Feb. 22, 1966   J. G. HOWELL, JR   3,236,134
APPARATUS FOR MANUFACTURING PAPERBOARD PARTITIONS
Filed Dec. 23, 1963   7 Sheets-Sheet 5

INVENTOR.
John G. Howell Jr.
BY J. R. Nelson and W. A. Schaich
Attorneys

United States Patent Office 3,236,134
Patented Feb. 22, 1966

3,236,134
APPARATUS FOR MANUFACTURING
PAPERBOARD PARTITIONS
John G. Howell, Jr., Piedmont, Calif., assignor to Owens-Illinois Glass Company, a corporation of Ohio
Filed Dec. 23, 1963, Ser. No. 332,372
8 Claims. (Cl. 83—211)

My invention is a novel method of and apparatus for manufacturing paperboard partitions.

The partitions involved preferably are formed of corrugated paperboard and each partition is of predetermined length and height with one or more notches opening through one longitudinal margin. A plurality of such partitions are assembled by placing them so as to interengage the notches, lock the partitions together and thereby produce a cell-creating unit which is to be placed in a carton for the purpose of preventing contact between bottles, or similar articles, for example.

An important object of my invention is the provision of a novel method wherein a paperboard sheet of specified width is advanced along a predetermined continuous, straightline path, through a number of zones or stations, in, or at, each of which the sheet is worked upon to the end that with completion of the work at the final station, the sheet will have been transformed into individual partitions ready for assembly and use in the creation of cell-forming units.

A further object of my invention is the provision of a novel method wherein a paperboard sheet is advanced along a selected path to a succession of stations, at the first of which a transverse series or row of parallel longitudinal slots are formed in the sheet, such slots later becoming the conventional notches in the partitions as a result of cutting the main sheet transversely along a line bisecting the slots near or perhaps at the rearmost end thereof.

Another object of my invention is the provision of novel apparatus which receives a paperboard sheet at one end, notches, slits and cuts the sheet at successive stations along its path of travel through the apparatus, so that at the end of a relatively short straight path, the sheet has been transformed into individual finally formed partitions, ready for assembly.

Still another object of my invention is the provision of novel apparatus of the above character in which the necessary operations upon the main or parent paperboard sheet, viz; slotting, slitting and cross-cutting, are performed while such sheet advances intermittently along a short continuous straight path, rather than effecting the slotting, etc., on a number of separate conventional machines which necessitate individual rehandling of the paperboard sheets with consequent low production speed and need for additional manual labor and therefore high production cost. It is also an object of my invention to provide novel apparatus in which a slotter, slitter and cross-cutter are so compactly arranged along the path of travel of a paperboard sheet as to enable one operator to care for both the feeding of sheets to the apparatus and supervision of its operation.

Likewise it is an object of my invention to provide a novel slotter unit which can be set up to form clean-cut slots of the desired length in the parent sheet preparatory to cross-cutting or severing such sheet to transform the slots into notches which later interlock the partition sheets in producing cell-like units.

Other objects will become apparent or will be pointed out hereinafter.

In the accompanying drawings forming a part of my application:

Figure 11:
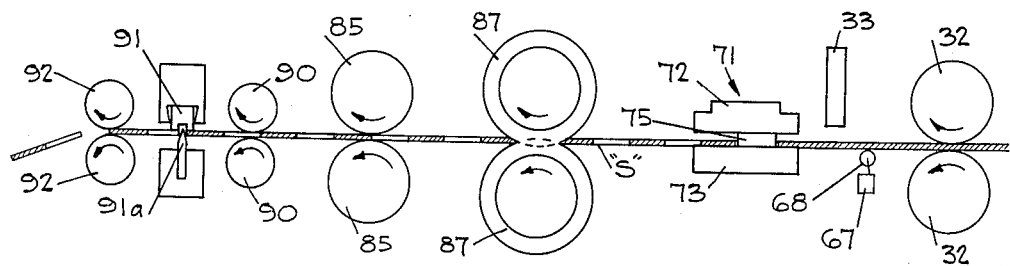
FIGS. 8, 9, 10 and 11 are views more or less diagrammatically illustrating the several units comprising the machine and showing the progress of a sheet therethrough and sequence of operations involved.
Figure 10:
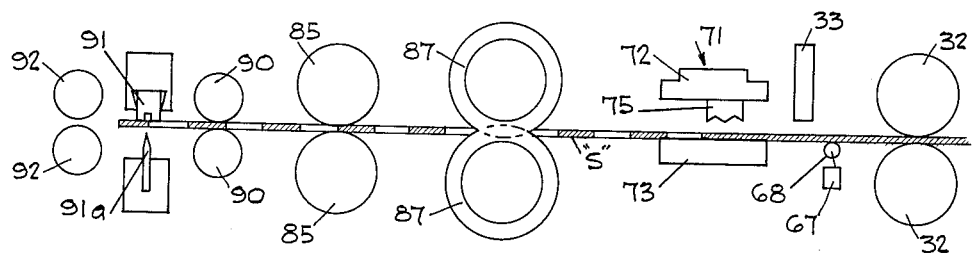
Figure 9:
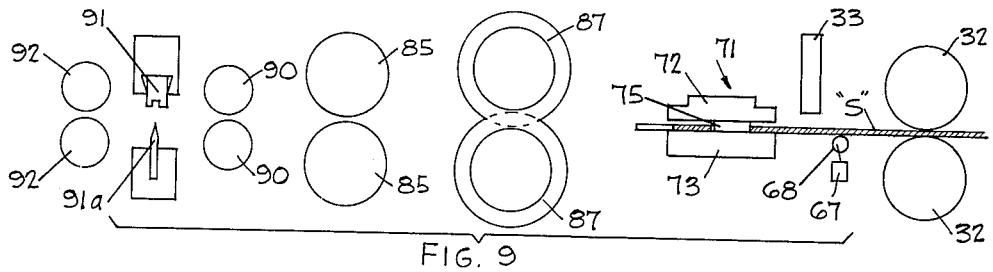
Figure 8:
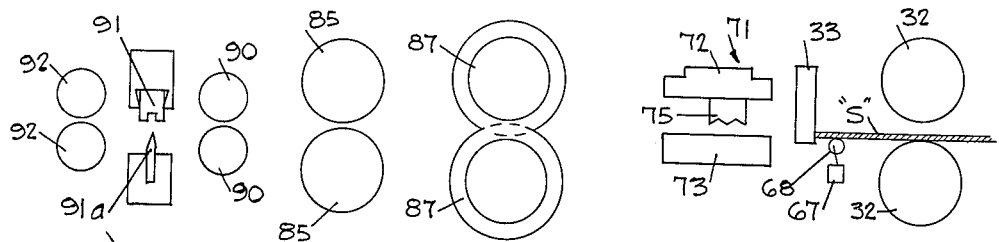
Figure 12:
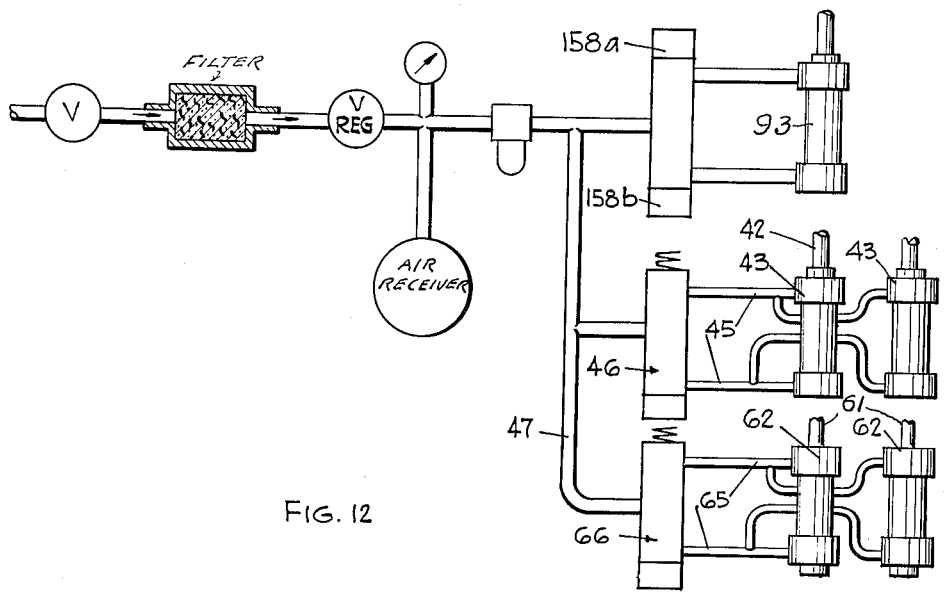
Figure 13:
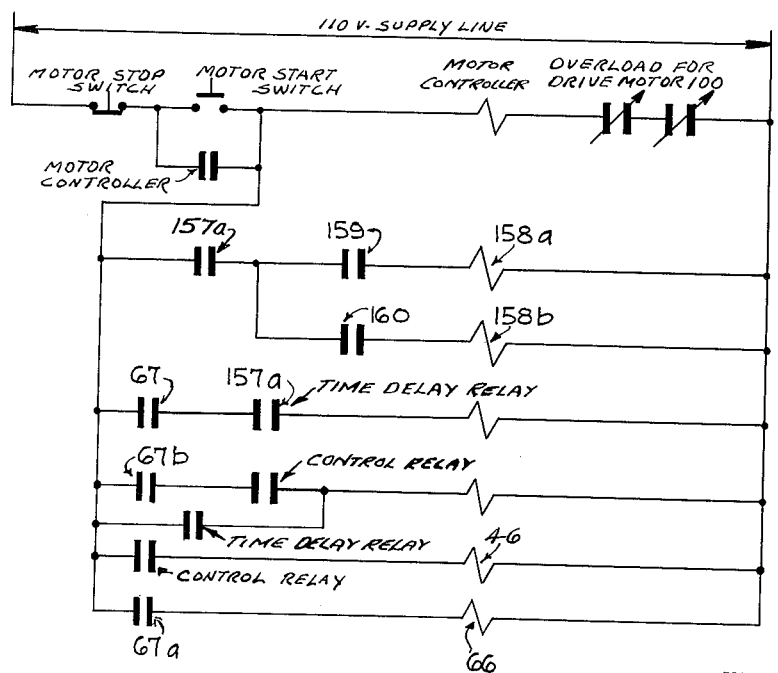

In FIG. 8 the sheet is in its initial position against the target stop bar 33a;

In FIG. 9 the target stop bar has released the sheet and the pull-rolls have advanced the sheet to the slotter unit 71;

In FIG. 10 the sheet has moved through the various zones or stations including the slitter unit;

In FIG. 11 the cycle has been completed and the cut-off knife unit has severed finished partitions from the sheet proper;

FIG. 12 is a diagrammatic showing of the compressed air piping system and controls for the air operated mechanism;

FIG. 13 is a schematic wiring diagram of the electrical system.

Basically, my invention comprises a unitary structure (FIG. 1) providing step-by-step, or intermittent, movement of a horizontally disposed paperboard sheet "S" along a continuous straightline path to and beyond a succession of working stations "A" and "B" and through a working zone "C" between said stations. At the first station "A," the sheet is longitudinally slotted while at the second station "B" the sheet is cut transversely at an end of a transverse row of the longitudinal slots, to create conventional paperboard partition notches and during advance of the sheet through zone "C," from station "A" to station "B," slitting means functions to continuously slit the sheet longitudinally at transversely spaced apart points properly related to the previously formed slots. Thus, when the cutting effected at station "B" has been completed, the partitions, completely finished and ready for assembling and use are discharged from the machine. Incorporated in the apparatus, as will be detailed hereinafter, is means for regulably controlling the distance advanced by the sheet in each step, to thereby predetermine the partition height.

Figure 1:
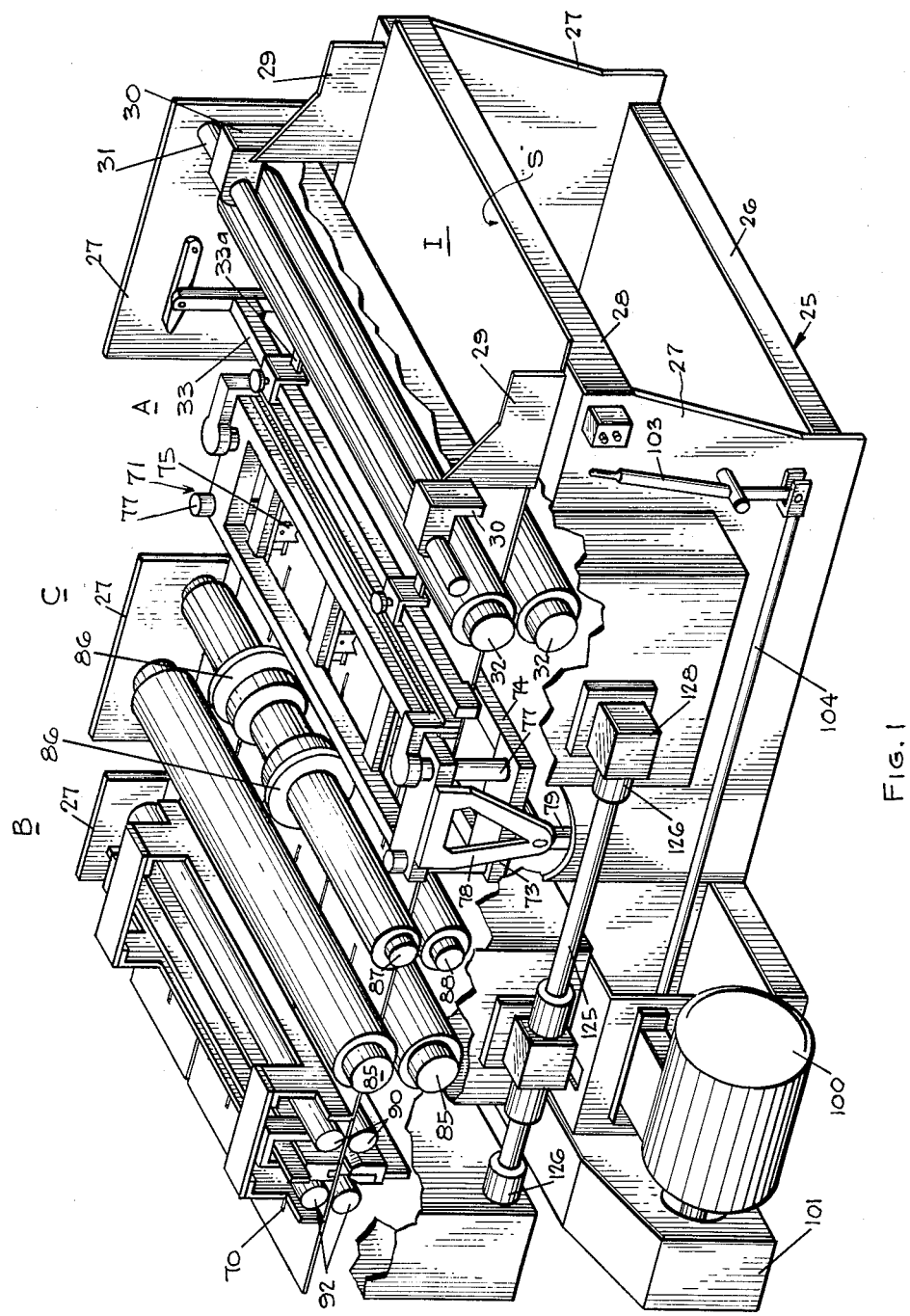
FIG. 1 is a perspective view of my invention with some cover parts removed and driving gears omitted, in the interest of clarity.
Figure 4:
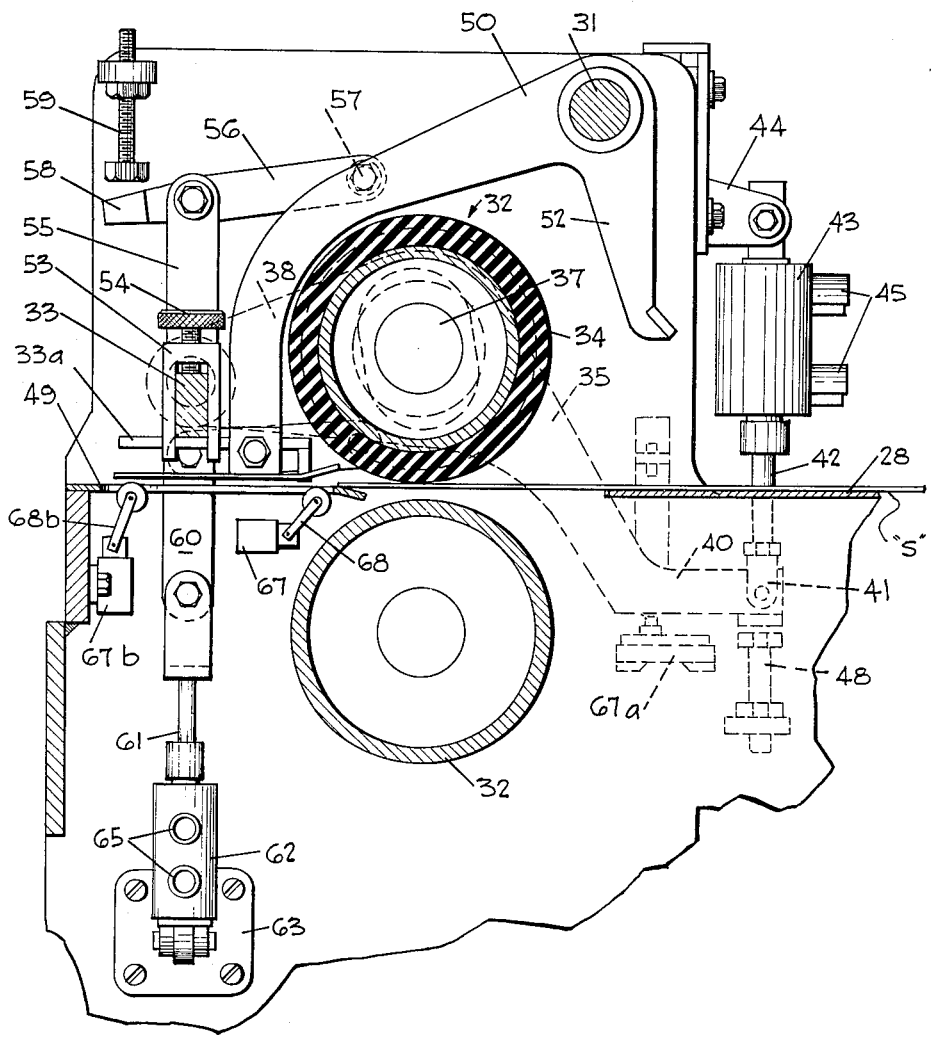
FIG. 4 is a fragmentary sectional elevational view at the front end of the apparatus showing the mechanism for actuating the target stop bar and the pull-roll raising and lowering mechanism.

In its illustrated embodiment, the apparatus (FIG. 1) embodying my invention, comprises an elongated horizontal frame 25 composed of a base 26, sides 27 and a horizontal feed table 28 above said base 26 at the inlet or feed end "I" of the apparatus. A paperboard sheet "S" of predetermined, but variable dimensions, is placed upon the feed table 28 (FIG. 1) between a pair of side guides 29 which are carried by brackets 30, the latter mounted upon a cross-rod 31 and adjustable therealong as dictated by the sheet width. This sheet is pushed into the machine between a pair of superposed horizontal pull-rolls 32 toward a vertically moveable horizontal target stop bar 33, which extends across the machine just ahead of station "A" and carries adjustable target stops 33a (FIGS. 1 and 4). The pull-rolls 32 are positively rotated at intervals and the upper of these rolls is moveable vertically into and out of engagement with the sheet, such being timed with actuation of the target stop bar 33 and stops 33a. At the initiation of an operation, viz the delivery of a fresh paperboard sheet to the machine, the leading edge of such sheet engages the stops 33a which momentarily arrest its advance. This insures proper initial placement of the sheet preparatory to slotting, slitting and cross-cutting, as will become more apparent hereinafter. The stops 33a are adjustably held in place on the bar 33 by brackets 53 and hand screws 54.

Figure 3:
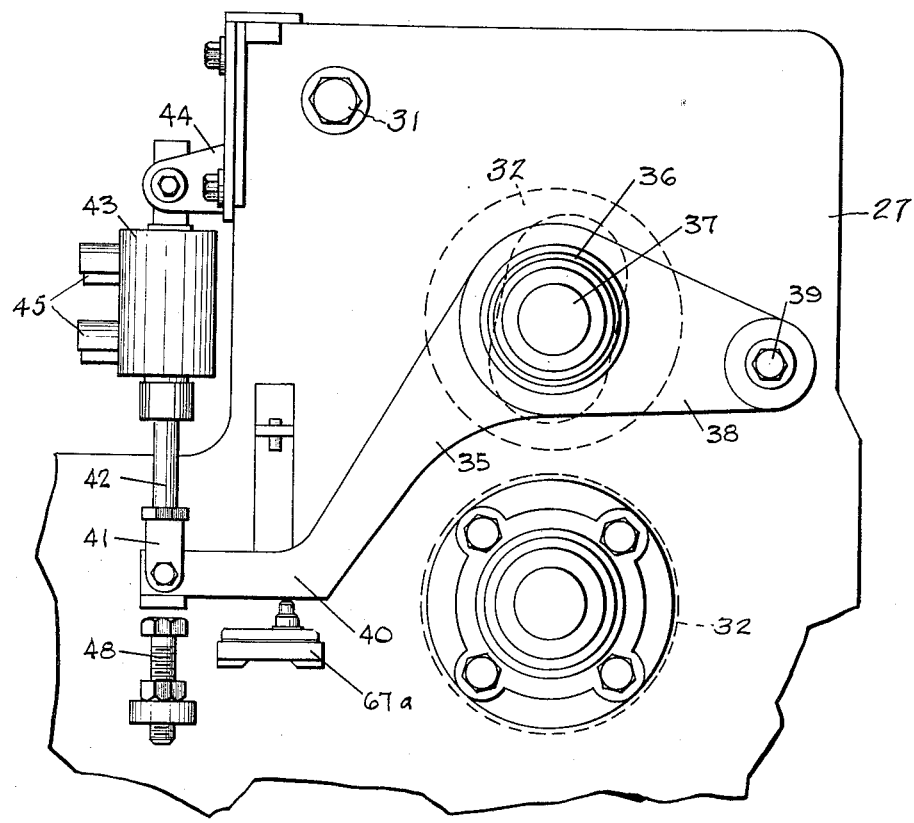
FIG. 3 is a fragmentary elevational view showing the first pair of pull-rolls and the mechanism for moving the upper roll vertically.

The upper pull-roll 32 (FIGS. 3 and 4) which has an external rubber or rubber-composition sleeve 34, for frictional engagement with the sheet "S," is supported at its ends in a pair of vertically rockable lift arms 35, or levers, provided with bearings 36 to accommodate stub-shafts 37 at the ends of said roll. Each lift arm 35 is of generally bell-crank shape, with one end 38 pivoted to a pin 39. The other end has a substantially horizontal finger 40 which is connected by a link 41 to the lower end of a piston rod 42 projecting downwardly from an air cylinder 43. This air cylinder, of which there are two (one at each side of the front end of the machine), is mounted upon a bracket 44 and connected to a source of air under pressure (not shown) through pipes 45 (FIGS. 3, 4 and 12) to a conventional spring return solenoid valve 46. This solenoid valve 46 (FIGS. 12 and 13) is connected to an air pressure supply conduit 47. An adjustable stop 48 (FIGS. 3 and 4) predetermines the lowermost position of the upper roll and therefore the pressure it exerts upon the sheet it is advancing.

The upper pull-roll 32 is lowered into engagement with and assumes control of the sheet "S" before the previously mentioned target stop bar 33 with its stops 33a has been elevated from its normal position in which it lies in the path of advance of the sheet. The lowering of the upper pull-roll 32 to engage the sheet "S" and subsequent raising of the target bar 33 and stops 33a are timed to occur only at the "dead" part of the intermittent feed cycle. Thus at the start of a subsequent feed cycle the sheet can be advanced immediately upon the creation of adequate frictional contact between it and the upper pull-roll. Projection of the sheet inwardly past the pull-rolls causes it to enter the guide 49 (FIG. 4) the upper wall of which is suspended from a fixed bracket 50, the latter carried by the aforementioned cross-rod 31 which supports the side guides 29 at the inlet end of the machine.

The stop bar 33 is secured at each end to vertical links 55 (FIG. 4) and is capable of movement vertically therein by a pair of cylinders 62, one of which appears in FIG. 4. The vertical links 55 are guided by a pair of levers 56 each of which has one end pivoted to the side wall 27 of the main frame 25 by a horizontal pin 57, while its other end 58, beyond the point of connection to the link 55 constitutes a finger capable of contact with an adjustable stop 59. This stop limits the extent of possible upward travel of the target stop bar 33. Each link 55 (FIG. 4) is connected to the piston rod 61 of a vertical air cylinder 62 (FIG. 12) which is attached to the main frame by a bracket 63. Air under pressure is supplied to opposite sides of the piston (not shown) through pipes 65 leading to a spring-return type of solenoid valve 66. This valve in turn is connected to the previously mentioned air supply line 47. A limit switch 67a is electrically connected to the solenoid valve 66, just described, which is operated by the lever 35 when the upper pull-roll 32 is lowered. This causes elevation of the target bar 33. The leading edge of a fresh sheet "S" strikes the switch arm 68 of switch 67, to thereby energize the solenoid valve 46 and cause lowering of the upper pull-roll 32 and immediate elevation of the stop-bar 33 out of the path of sheet advance. Thus the sheet is advanced a distance which is predetermined by the extent of rotation of the pull-rolls 32 and this depends upon the partition height desired and is controlled by pre-setting a rack and pinion mechanism 69 (FIG. 2) as regards the stroke of the rack itself. The details of the drive mechanism for this rack and pinion unit and other parts will be described presently.

Figures 5, 6, 7:
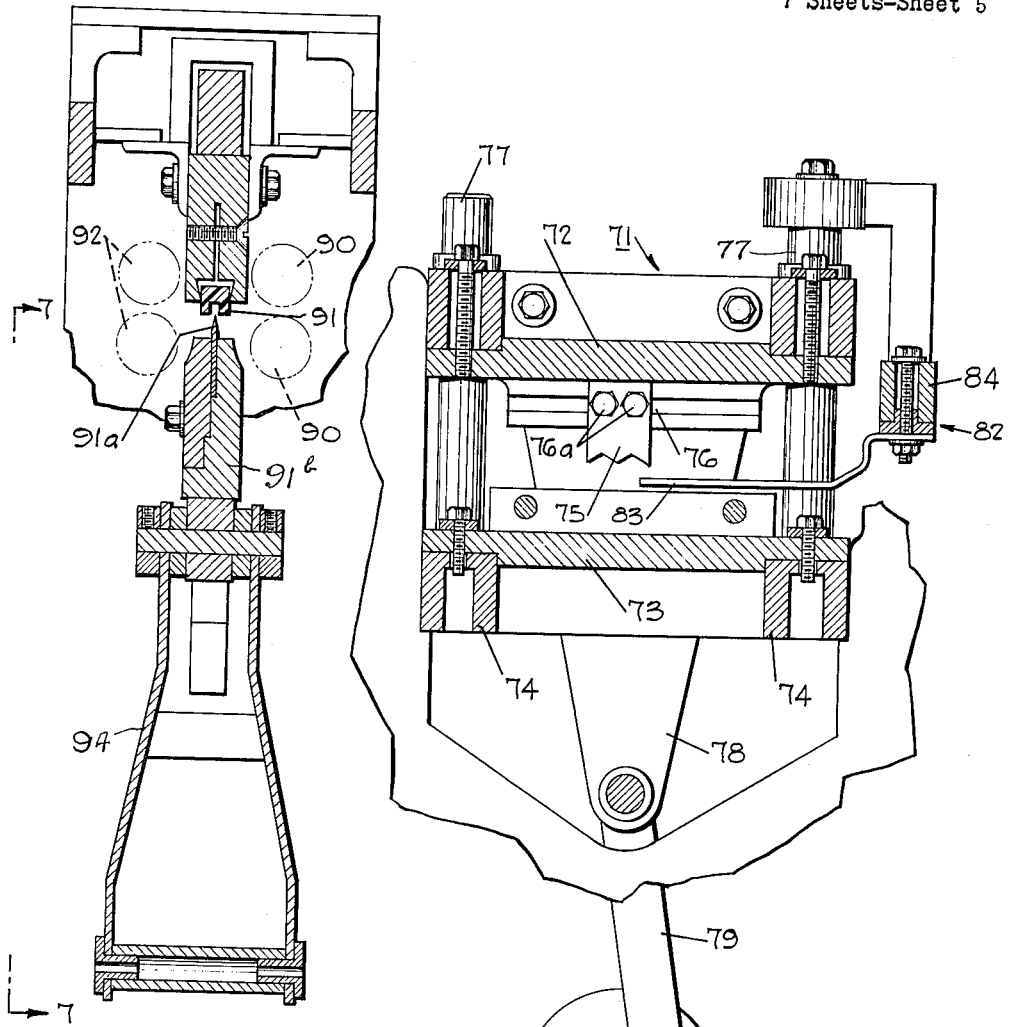
FIG. 5 is a cross-sectional view of the cut-off knife mechanism taken substantially along the plane of line 5—5 of FIG. 7.
FIG. 6 is a fragmentary sectional elevational view of the slotter mechanism.
FIG. 7 is a fragmentary elevational view of the cut-off knife mechanism shown in FIG. 5, taken at line 7—7 of FIG. 5.

Under the influence of the pull-rolls 32, the sheet "S" is advanced so that it is positioned momentarily at the slotting station "A." Here a transverse row of parallel longitudinal slots 70 are formed in the sheet, such slots being of a length approximately, if not precisely, that of the final notches required in the partitions. At this station is a slotter unit 71 (FIGS. 1 and 6) comprising upper and lower male and female knife holders 72 and 73, respectively. The lower holder 73 is supported against vertical movement in cross-bars 74 and cooperates with a plurality of knives 75 which depend from the upper holder 72. By means of a slot 76 and screws 76a, each knife 75 can be adjusted as to cutting position, lengthwise of the machine and sheet. The upper holder 72 is slidable vertically upon four corner guide posts 77 rising from the lower knife holder 73. At each end of the upper knife holder 72 is a depending bracket 78 connected to a link 79 which in turn is secured to a crank 80 (FIG. 2) the latter mounted upon a driven horizontal shaft 81. The source of power for driving this shaft will be detailed presently. To insure clean separation of the slotting knives with each operation so that the paperboard sheet does not rise excessively incident to withdrawal of the knives, a stripper unit 82 is mounted upon the slotter. This stripper comprises a horizontal blade 83 which overlies the advancing sheet "S" in a plane below the retracted position of the knives 75. A holder 84 for this blade is attached to the upper end of those two of the corner guide posts 77 nearest the pull-rolls 32. Thus with each slotting operation the stripper blade 83 functions as a hold-down for the sheet, as the knives 75 are elevated.

Following the slotting operation at station "A" the sheet moves on through zone "C" to the final cut-off station "B." During its travel through zone "C," caused by the previously mentioned pull-rolls 32 and a pair of auxiliary pull-rolls 85, the sheet "S" is slitted lengthwise along preselected lines and between certain groups of the previously formed longitudinal slots 70. Such slitting is effected by a driven horizontal knife-carrying shaft 87 which has its ends journaled in the side walls 27 of the main frame. Below this knife carrying shaft 87 is a second knife carrying shaft 88 which is driven in a manner and by mechanism which will be described presently. Knives 86 are mounted on these shafts 87 and 88 for adjustment along the latter.

The slitted sheet next advances to the cross-cutting station "B" where a cut-off knife unit severs the sheet transversely of its length to produce finished partitions of the desired height and with a notch 70 or notches of the desired height and with a notch 70 or notches opening through one edge. This cut-off unit (FIGS. 1, 5 and 7) comprises a knife holder 91b extending transversely of the machine and carrying an elongated knife 91a which cooperates with a fixed channeled anvil 91. Lateral movement of the knife is provided to create a shearing cutting motion. To this end the knife holder 91b is supported on parallel pivoted arms 94. An air cylinder 93 operates to laterally move the knife holder 91b. Thus the knife has both horizontal and vertical motion so as to cleanly shear the paperboard. Limit switches 159 and 160 (FIGS. 7, 12 and 13), actuated alternately by one of the arms 94 (FIG. 7) operate through suitable circuitry to control the air cylinder 93 operation so as to effect intermittent shearing movement of the knife 91a. Each knife stroke cuts off a row of partitions and as will be observed, such knife has an undulated upper cutting edge, which contributes immeasurably to clean shearing of the paper.

As the slitted and slotted sheet enters station or zone "B" for the final cut-off operation, it passes between a pair of superposed guide-rolls 90, thence between the knife 91a and anvil 91 and finally between a pair of superposed horizontal pull-rolls 92 which assume control of the advancing movement of the sheet. These pull-rolls 92 are positively driven in one direction by mechanism which will be described presently.

Figure 2:
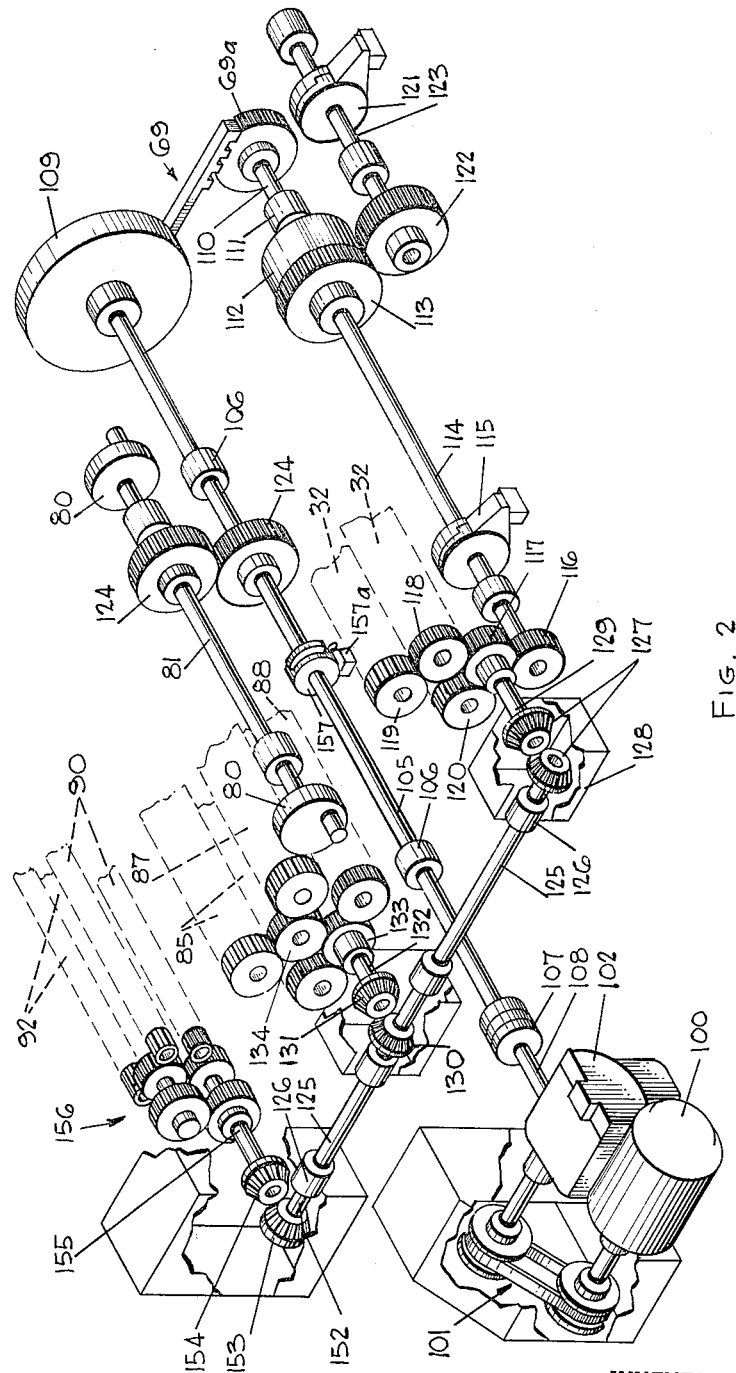
FIG. 2 is a perspective view illustrating the mechanism for operating the pull-rolls, slotter, slitters, etc., shown in FIG. 1.

In FIGS. 1 and 2 I have illustrated a mechanism capable of operating the pull-rolls, cutters, etc., in proper timed relationship. As shown, it comprises a motor 100 driving a sheave and belt unit 101 which is connected to a clutch 102 capable of being actuated manually by a handle 103 and connector rod 104 which are mounted upon a side 27 of the main frame 25. A driven power-shaft 105 (FIG. 1) extending horizontally across the apparatus is journaled in bearings 106 and at one end is connected by a flexible coupling 107 to a short shaft 108 which has direct connection to the clutch 102. At that end remote from the coupling 107, this power shaft carries an adjustable stroke crank 109 to which the previously mentioned rack and pinion unit 69 is connected. By reason of this adjustable stroke feature, which is conventional, the extent of rotation of the pinion 69a can be varied and as a consequence determine the distance advanced by the sheet "S" during each operating cycle, or step. A countershaft 110 carries the pinion 69a and is journaled in a bearing 111 in a side wall 27 of the main frame 25. At the inner end of this counter-shaft 110 is a differential gear unit 112, which may well be of the same structure as the conventional differential of an automobile, such driving a ring gear 113. This ring gear 113 drives a horizontal shaft 114, which, through an over-running clutch 115 drives a pinion 116 meshing with and rotating a gear 117, the latter operating through an idler gear 118 to rotate a pinion 119 at one end of the upper pull-roll 32 at the inlet end of the machine and meshing directly with a pinion 120 which is attached to an end of the lower pull-roll 32. The aforementioned ring gear 113 near the rack and pinion unit 69 is connected to an overrunning clutch 121 through a pinion 122 and shaft 123. These overrunning clutches 115 and 121 operate to prevent reverse rotation of the pull-rolls as the rack and pinion unit reverses itself or goes through its idle stroke. This obviously is important in insuring movement of the sheet "S" in one direction only.

The previously mentioned cranks 80 and supporting shaft 81 which actuate the slotter unit 71 at station "A," are rotated by means of meshing gears 124, one of which is secured to the shaft 81, while the other is mounted upon the counter-shaft 105.

A horizontal shaft 125 extending alongside or lengthwise of the machine near the motor 110, drives gear trains for operating the previously mentioned auxiliary pull-rolls 85 and 92. This shaft 125 is journaled in bearings 126 and receives its power from the cross-shaft 114 through a pair of meshing bevel gears 127 in a housing 128, one of these gears being mounted on a stub shaft 129 which is driven by the gear 117. Substantially midway the length of this horizontal shaft 125 is a bevel gear 130 which drives a bevel gear 131 carried by a stub shaft 132. This stub shaft 132 drives a pinion 133 that meshes with a gear 134, which in turn drives the gears on the end of shafts 85, 87 and 88.

At the discharge end of the machine, this horizontal shaft 125 carries a bevel gear 153 which meshes with and drives a bevel gear 154, the latter mounted upon a stub-shaft 155 having driving connection with a gear train 156 which rotates the previously mentioned guide-rolls 90 and auxiliary pull-rolls 92.

Referring to FIG. 13 in relation to FIGS. 4 and 12 the limit switch 67a which is closed by lowering of the upper pull-roll 32 actuates the solenoid valve 66 and through it, the target bar moving cylinders 62. Thus the target bar 33 is elevated at the proper time. Limit switch 67b having an arm 68b functions to prevent lowering of the target bar 33 or raising of the pull-roll 32 until the sheet "S" being fed clears same. The control relays in circuit with the limit switch function in customary fashion. The limit switch 67 operates through a cam actuated limit switch 157a and time delay relay to initiate lowering of the upper pull-roll 32, as stated heretofore. Limit switches 159 and 160 are connected to and control operation of the solenoid valves 158a and 158b which regulate the delivery of air under pressure to the air cylinder 93 and cause movement of the cut-off knife back and forth across the apparatus, with each movement a working or cutting stroke.

Reviewing the operation of this machine, initially the upper pull-roll 32 is elevated and the target stop bar 33 with its stops 33a is in its lowermost position. A sheet "S" of paperboard is pushed into the machine between the spaced-apart pull-rolls 32 (FIG. 8) and far enough to engage the target stops and concurrently strikes the limit switch arm 68. Immediately the solenoid valve 46 is operated to allow air under pressure to flow into the pull-roll lowering cylinders 43 to bring the upper roll 32 downwardly into firm contact with the sheet, thus gripping the latter between the two rolls. When the upper pull-roll lowers, it actuates the limit switch 67a to thereby energize the solenoid valve 66 so that the target 33 is lifted clear of the front edge of the sheet at this same time by means of the air cylinder 62, such resulting from actuation of the solenoid valve 66 in response to the limit switch 67a operation. The path now is clear for advancing the sheet "S" a predetermined distance beyond the target stop bar 33.

The pull-rolls 32 are immediately rotated by the rack and pinion unit 69 (FIG. 2) with the adjustable rack stroke predetermining the distance advanced by the sheet. Such distance is sufficient to position the front edge of the sheet substantially in register with the innermost end of the slotting knives 75 (FIG. 9). Succeeding advances of the sheet to the slotter at station "A" are of uniform distance so that the transverse rows of slots 70 are spaced apart uniformly along the length of the sheet. Transverse severance of the sheet at station "B" (FIGS. 1, 9 and 10) occurs at regularly spaced intervals so as to cut across the slots substantially at the extreme forward ends thereof.

During the advance of the sheet to the cut-off station "B" it passes through a slitter in zone "C" wherein rotary knives 86 slit the sheet longitudinally continuously between certain of the slots 70 which have just been formed at station "A." The location of these slitting knives 86 determines the length of the finally formed partition strips. The auxiliary pull-rolls 85 aid in advancing the sheets through the slitting zone "C" and on to the cut-off station "B" where the other auxiliary pull-rolls 92 perform the final sheet moving function. At this cut-off station "B" the knife 91a shears the sheet transversely along a line bisecting the leading end of each row of slots 70. This cut determines the partition strip height and completes the strip formation so that it now is ready for assembly with others preparatory to placement in a shipping carton.

Modifications may be resorted to within the spirit and scope of the appended claims.

I claim:

1. In apparatus for producing notched paperboard partitions, means for advancing an elongated sheet of paperboard step-by-step along a path to and beyond a plurality of stations, a slotter at a first station for forming a multiplicity of parallel spaced apart longitudinal slots in rows across the sheet, means at a second station for severing the sheet transverely along a line bisecting the slots at one end, rotating knives providing slitting means for cutting the sheet longitudinally from end to end between selected slots during advance of the sheet from the first station to the second station and means for regulably controlling the distance the sheet advances with each step, the sheet advancing means in part comprising a pair of driven superposed horizontal pull-rolls ahead of the first station between which rolls the sheet advances, means for moving the upper roll vertically into contact with the sheet, sheet advance stop means between said rolls and the first station and means under the control of the sheet for causing actuation of the stop means and roll moving means.

2. In apparatus as defined in claim 1, the stop means being a vertically moveable horizontal bar, means for moving the bar into and out of the path of travel of the sheet, and a limit switch operable by contact with the sheet for actuating the bar moving means.

3. In apparatus as defined in claim 1, the upper roll moving means being a pair of piston air cylinders connected one at each end of said roll, and control means for the cylinders operation connected to said limit switch.

4. In apparatus as defined in claim 1, the means for driving the rolls including rack and pinion mechanism for rotating the rolls in one direction only.

5. In apparatus as defined in claim 4, there being a crank disc for reciprocating the rack and an adjustable connection between the disc and rack whereby to vary the rack stroke.

6. In apparatus for producing notched paperboard partitions, means for advancing an elongated sheet of paperboard step-by-step along a generally horizontal path to and beyond a plurality of working stations, a slotter at a first station for forming a transverse row of parallel equidistantly spaced apart longitudinal slots in said sheet, means at a second station for severing the sheet transversely at the lead end of the row of slots, and slitting means for cutting the sheet end to end longitudinally between certain slots during advance of the sheet to the second station and means for cutting the slotted and slitted sheet transversely through its entire width following the slitting of same, the sheet advancing means being a pair of superposed horizontal pull-rolls just ahead of each said working stations, the upper of the pair of rolls ahead of the first station being moveable vertically to and from a sheet-engaging level, means for moving said upper roll vertically and means for rotating all of the pull-rolls incident to completion of lowering said upper roll to the sheet-engaging level.

7. In apparatus as defined in claim 6, the pull-rolls rotating means comprising rack and pinion driven gears and shafts and means for regulably controlling the rack stroke whereby to predetermine the extent of rotation of the rolls.

8. In apparatus for producing notched paperboard partitions, means for advancing an elongated sheet of paperboard step-by-step along a path to and beyond a plurality of stations, a slotter at the first station for forming a multiplicity of parallel spaced apart longitudinal slots in rows across the sheet, means at a second station for severing the sheet transversely along a line bisecting the slots at one end, slitting means for cutting the sheet longitudinally between selected slots during advance of the sheet from the first to the second station, means for regulably controlling the distance the sheet advances with each step, the sheet advancing means in part comprising a pair of driven superposed horizontal pull-rolls ahead of the first station between which rolls the sheet advances, means for moving the upper roll vertically into contact with the sheet, sheet advance stop means between said rolls and the first station, means under the control of the sheet for causing actuation of the stop means and roll moving means, said stop means being a vertically movable horizontal bar, means for moving the bar into and out of the path of travel of the sheet, a limit switch operable by contact with the sheet for actuating the bar moving means, the upper roll moving means being a pair of piston air cylinders connected one at each end of said roll, and control means for the cylinder operation connected to said limit switch.

References Cited by the Examiner

UNITED STATES PATENTS

| | | | |
|---|---|---|---|
| 601,719 | 4/1898 | Taylor | 83—643 X |
| 1,473,377 | 11/1923 | Langston | 83—302 X |
| 1,487,662 | 3/1924 | Langston | 83—302 X |
| 1,532,538 | 4/1925 | Langston | 83—302 |
| 1,762,330 | 6/1930 | Fiedler et al. | 83—405 X |
| 1,808,500 | 6/1931 | Holny | 83—405 X |
| 1,984,647 | 4/1933 | Leonard. | |
| 2,701,013 | 2/1955 | Klasing | 83—391 X |
| 2,722,276 | 11/1955 | Revelle | 226—155 X |
| 2,852,074 | 9/1958 | Wahl et al. | 83—255 |
| 2,962,943 | 12/1960 | Mumper | 83—643 X |

FOREIGN PATENTS 846,829    8/1960    Great Britain.

WILLIAM W. DYER, Jr., *Primary Examiner.*

ANDREW R. JUHASZ, *Examiner.*